US012747763B2

(12) United States Patent
Hur

(10) Patent No.: US 12,747,763 B2
(45) Date of Patent: Sep. 29, 2026

(54) BRAKE DUST COLLECTOR

(71) Applicant: HL MANDO CORPORATION, Pyeongtaek-si (KR)

(72) Inventor: Jaejin Hur, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 448 days.

(21) Appl. No.: 18/232,055

(22) Filed: Aug. 9, 2023

(65) Prior Publication Data

US 2024/0229875 A1 Jul. 11, 2024

(30) Foreign Application Priority Data

Jan. 9, 2023 (KR) ........................ 10-2023-0002890

(51) Int. Cl.
*F16D 65/00* (2006.01)
*F16D 65/847* (2006.01)

(52) U.S. Cl.
CPC ....... *F16D 65/0031* (2013.01); *F16D 65/847* (2013.01)

(58) Field of Classification Search
CPC ............ B01D 46/0005; B01D 46/0013; B01D 46/10; B01D 46/0002; B01D 46/106; B01D 46/0046; B01D 2279/40; B01D 2265/029; B01D 2275/307; F16D 65/0031;

(Continued)

(56) References Cited

U.S. PATENT DOCUMENTS 5,671,827 A * 9/1997 Demetriou ............ F16D 65/847 188/73.46
2010/0065387 A1 3/2010 Tsiberidis (Continued)

FOREIGN PATENT DOCUMENTS

DE 103 36 984 A1 3/2005
DE 102019110969 A1 * 10/2020 ......... F16D 65/0031

(Continued)

OTHER PUBLICATIONS

English machined translation of DE-102019110969 A1, Oct. 29, 2020.*

(Continued)

*Primary Examiner* — Robert A. Siconolfi
*Assistant Examiner* — San M Aung
(74) *Attorney, Agent, or Firm* — Hauptman Ham, LLP

(57) ABSTRACT

Disclosed herein is a brake dust collector. The brake dust collector in accordance with one embodiment of the present disclosure may include: a brake module including a pair of brake pads that are respectively disposed on both sides of a disc rotating together with a wheel and are in close contact with or separated from the disc according to a forward and backward movement of a piston; a housing including a base bracket fastened to the brake module, an inner housing fastened to the base bracket, and an outer housing fastened to the inner housing and configured to cover a part of the brake module by providing filter module detachable portions in a circumferential direction of the disc in a leading portion and a trailing portion, respectively; and filter modules provided to be detachable from the filter module detachable portions, respectively.

20 Claims, 11 Drawing Sheets

(58) Field of Classification Search
CPC .. F16D 65/847; F16D 55/227; F16D 55/2265; F16D 55/22; F16D 55/0037; B60T 17/22
USPC .................................................... 188/218 A
See application file for complete search history.

(56) References Cited

U.S. PATENT DOCUMENTS

| | | | | |
|---|---|---|---|---|
| 2014/0054119 | A1* | 2/2014 | Hummel | F16D 65/0031 188/218 A |
| 2014/0054120 | A1 | 2/2014 | Hummel et al. | |
| 2014/0054121 | A1* | 2/2014 | Hummel | F16D 65/0031 55/522 |
| 2018/0031059 | A1 | 2/2018 | Gelb | |
| 2020/0278002 | A1* | 9/2020 | Bock | B01D 46/106 |
| 2021/0033157 | A1 | 2/2021 | Vyletel et al. | |
| 2021/0140497 | A1* | 5/2021 | Kuemmerling | F16D 65/0031 |
| 2022/0042559 | A1* | 2/2022 | Bock | F16D 55/227 |
| 2022/0341477 | A1* | 10/2022 | Woerz | F16D 65/0031 |

FOREIGN PATENT DOCUMENTS

| | | | |
|---|---|---|---|
| DE | 10 2020 111 811 | A1 | 11/2021 |
| DE | 10 2020 126 890 | A1 | 4/2022 |
| JP | 5636911 | B2 | 12/2014 |
| KR | 10-2020-0045498 | A | 5/2020 |
| KR | 10-2261576 | B1 | 6/2021 |
| KR | 10-2022-0027814 | A | 3/2022 |
| KR | 10-2022-0094325 | A | 7/2022 |
| KR | 10-2022-0163108 | A | 12/2022 |
| WO | 2022/219849 | A1 | 10/2022 |

OTHER PUBLICATIONS

The Extended European Search Report dated Jan. 30, 2024 for corresponding European Patent Application No. 23190625.6 (6 pages).
Korean Office Action issued on Apr. 15, 2026, in connection with the corresponding Korean Patent Application No. 10-2023-0002890, along with an English machine translation. (12 pages).

* cited by examiner

BRAKE DUST COLLECTOR

CROSS-REFERENCE TO RELATED APPLICATION

This application claims the benefit of Korean Patent Application No. 10-2023-0002890, filed on Jan. 9, 2023 in the Korean Intellectual Property Office, the disclosure of which is incorporated herein by reference.

BACKGROUND

1. Field

Embodiments of the present disclosure relate to a brake dust collector, and more particularly, to a brake dust collector for collecting dust caused by friction between a brake pad and a disc during a braking operation.

As the importance of environmental protection is emphasized, environmental friendliness has become a big issue in the automobile industry, and regulations on pollutants emitted from automobiles are also being continuously strengthened.

Meanwhile, pollutants emitted from vehicles may be largely classified into pollutants emitted from an exhaust system and pollutants emitted from a non-exhaust system. The pollutants emitted from the exhaust system are pollutants contained in exhaust gas, which is generated when an engine of a vehicle is driven, and are already subject to regulations, while the pollutants emitted from the non-exhaust system are expected to be subject to corresponding regulations.

Specifically, among the pollutants emitted from the non-exhaust system, dust generated due to abrasion caused by a frictional force between a brake pad and a disc during vehicle braking contains a large amount of harmful substances, so that a method for minimizing the dust is required in line with the fact that regulations on harmful dust and fine dust are gradually tightening.

In addition, since a fixed-type caliper brake including a monoblock caliper usually provides a relatively stable braking power even in high-speed repetition, vehicle models to which the fixed-type caliper brake is applied are relatively high-performance vehicles and a large amount of dust is generated between discs and brake pads, and thus a method of reducing the dust is required all the more urgently.

Meanwhile, in order to meet the requirement, the conventional dust collector is provided as a separate device for dust collection on one side of a caliper housing, which reduces aesthetics and also reduces maintainability because the device body should be removed from the vehicle to clean or replace the filter.

SUMMARY

Therefore, it is an aspect of the present disclosure to provide a brake dust collector capable of effectively collecting dust that is generated by friction between a disc and a brake pad and discharged to the outside of a housing.

It is another aspect of the present disclosure to provide a brake dust collector capable of improving dust collection efficiency by a filter module provided in each of a leading portion and a trailing portion.

It is still another aspect of the present disclosure to provide a brake dust collector capable of facilitating filter cleaning and replacement and improving maintainability by providing a filter module detachable from a housing.

It is yet another aspect of the present disclosure to provide a brake dust collector capable of further improving dust collection efficiency by a dust cup that is provided at a lower side of a filter module to finally collect dust discharged to the outside of a housing.

It is yet another aspect of the present disclosure to provide a brake dust collector capable of further improving dust collection efficiency by a guide wing that is provided inside a filter module to control a fluid flow.

It is yet another aspect of the present disclosure to provide a brake dust collector capable of preventing aesthetics of a housing from being reduced by a filter module that is separately provided at one side of the housing.

It is yet another aspect of the present disclosure to provide a brake dust collector capable of further improving heat dissipation performance when exhausting heat caused by friction between a disc and a brake pad to outside of a housing.

Additional aspects of the disclosure will be set forth in part in the description which follows and, in part, will be obvious from the description, or may be learned by practice of the disclosure.

In accordance with one embodiment of the present disclosure, a brake dust collector includes: a brake module including a pair of brake pads that are respectively disposed on both sides of a disc rotating together with a wheel and are in close contact with or separated from the disc according to a forward and backward movement of a piston; a housing including a base bracket fastened to the brake module, an inner housing fastened to the base bracket, and an outer housing fastened to the inner housing and configured to cover a part of the brake module by providing filter module detachable portions in a circumferential direction of the disc in a leading portion and a trailing portion, respectively; and filter modules provided to be detachable from the filter module detachable portions, respectively.

Each of the filter module detachable portions may be provided across the inner housing and the outer housing.

Each of the filter modules may include a filter cover detachably provided for the filter module detachable portion and at least one filter provided inside the filter cover.

One side of the filter cover may be detachable from the outer housing and the other side of the filter cover may be detachable from the inner housing.

The filter may include a main filter provided in the circumferential direction of the disc inside the filter cover, and a sub filter provided to a side of the inner housing inside the filter cover, and the sub filter may be fastened to an inner side of the inner housing.

The filter module may further include a dust cup provided below the filter, and the dust cup may be fastened to an inner end of each of the leading portion and the trailing portion.

The filter module may further include at least one guide wing that is provided on a side surface or a circumferential surface of the disc and induces a fluid flow to the filter, and the guide wing may be provided to be angle-adjustable for the filter.

The housing may further include a plurality of heat dissipation holes provided between the filter module detachable portions.

In accordance with another embodiment of the present disclosure, a brake dust collector includes: a brake module including a pair of brake pads that are respectively disposed on both sides of a disc rotating together with a wheel and are in close contact with or separated from the disc according to a forward and backward movement of a piston; a housing formed to cover a part of the brake module by providing a filter module detachable portion in a circumferential direction of the disc in at least one of a leading portion or a trailing portion; and one or two filter modules detachably provided for the filter module detachable portion.

The filter module may include a filter cover detachably provided for the filter module detachable portion and at least one filter provided inside the filter cover.

One side of the filter cover may be detachable from one side surface of the housing and the other side of the filter cover may be detachable from the other side surface of the housing.

The filter module may further include a dust cup provided below the filter, and the dust cup may be fastened to at least one of an inner end of the leading portion or an inner end of the trailing portion.

The filter module may further include at least one guide wing that is provided on a side surface or a circumferential surface of the disc and induces a fluid flow to the filter, and the guide wing may be provided to be angle-adjustable for the filter.

The housing may be provided as a monoblock integrally formed with a case of the brake module.

The housing may further include a plurality of heat dissipation holes.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings may omit the illustration of parts not related to the description in order to clarify the present invention, and slightly exaggerate the size of the components to help understanding.

Figure 1:
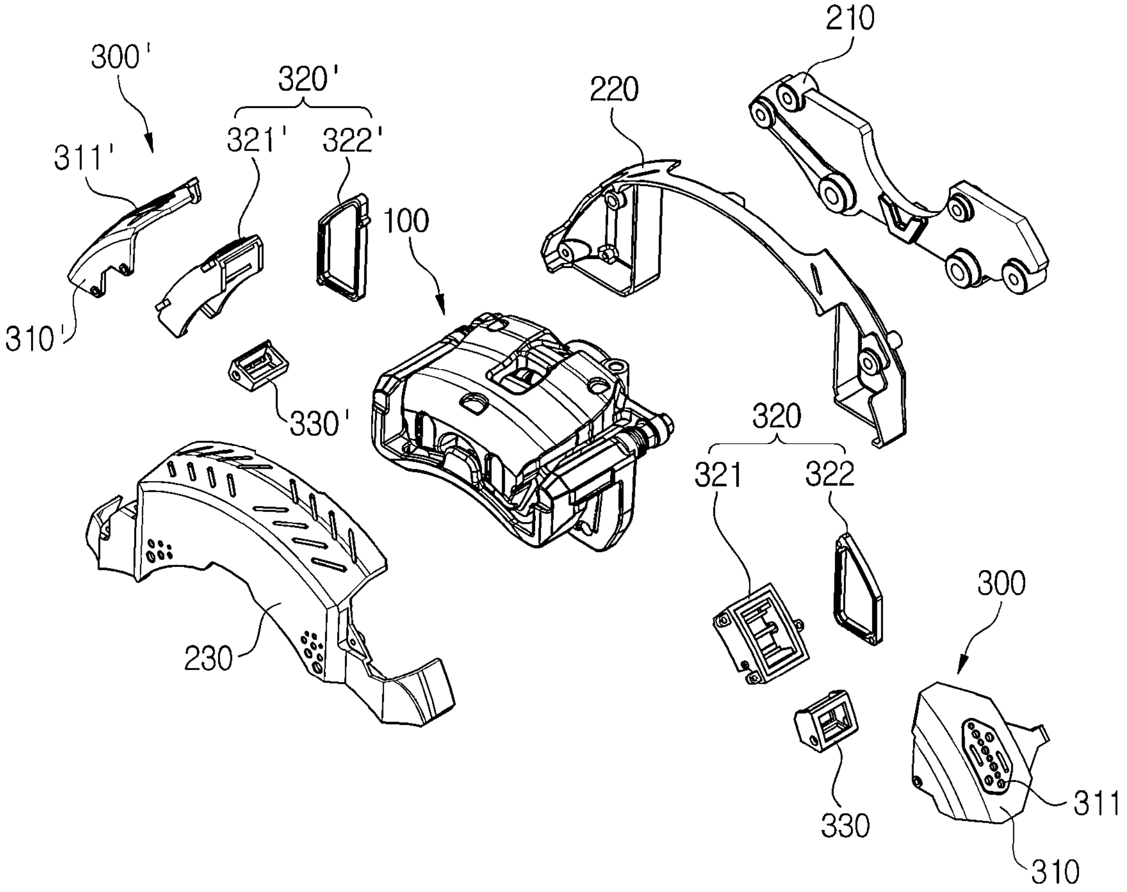
FIG. 1 is an exploded perspective view of a brake dust collector in accordance with one embodiment of the present disclosure.
Figure 2:
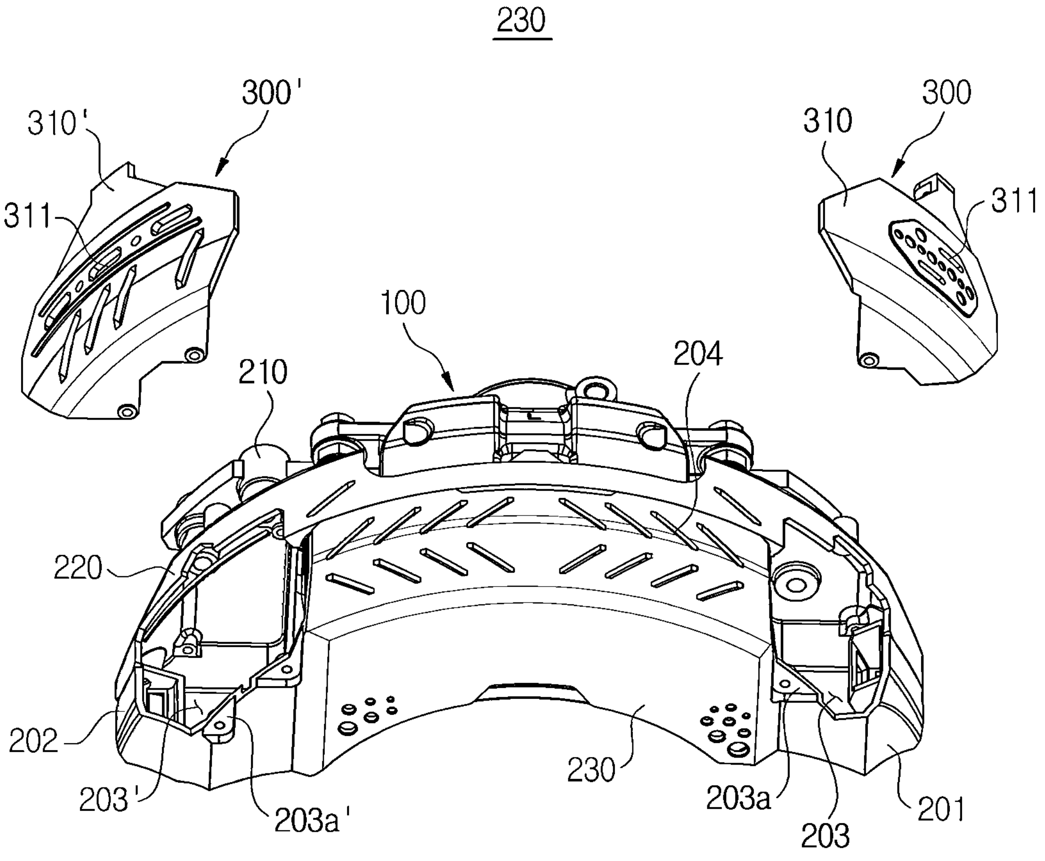
FIG. 2 is a view illustrating a state where a filter module of the brake dust collector in accordance with one embodiment of the present disclosure is separated.

FIG. 1 is an exploded perspective view of a brake dust collector in accordance with one embodiment of the present disclosure, and FIG. 2 is a view illustrating a state where a filter module of the brake dust collector in accordance with one embodiment of the present disclosure is separated.

Figure 3:
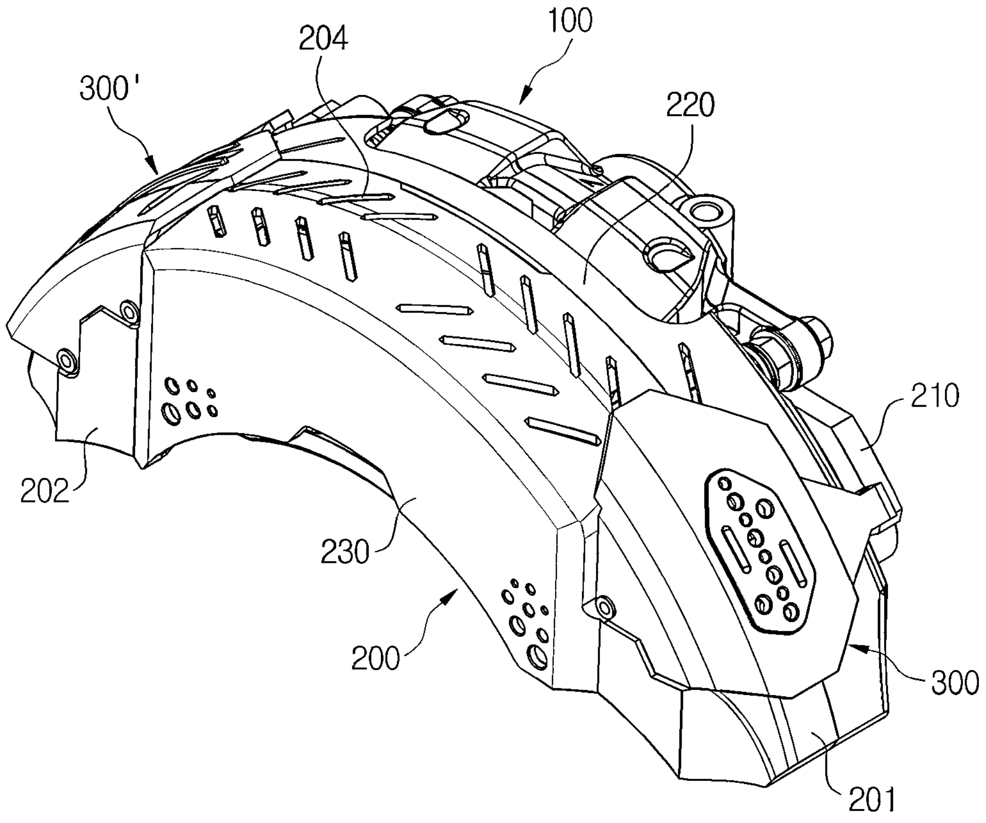
FIG. 3 is a front perspective view illustrating the brake dust collector in accordance with one embodiment of the present disclosure.
Figure 4:
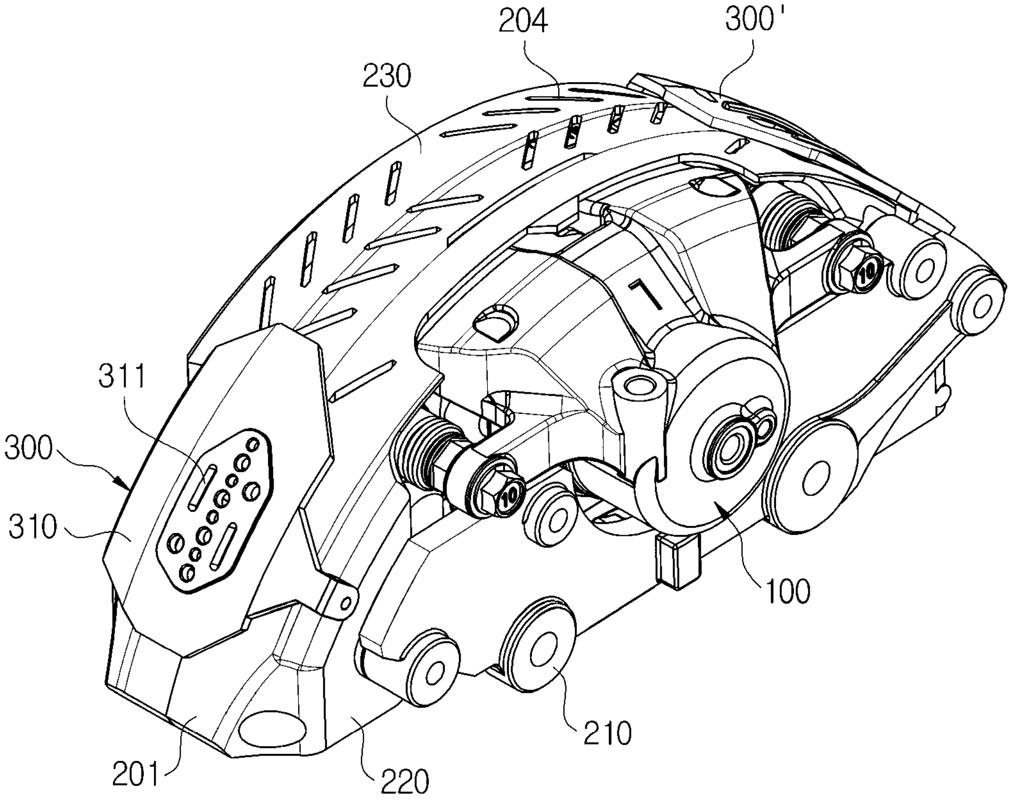
FIG. 4 is a rear perspective view illustrating the brake dust collector in accordance with one embodiment of the present disclosure.
Figure 5:
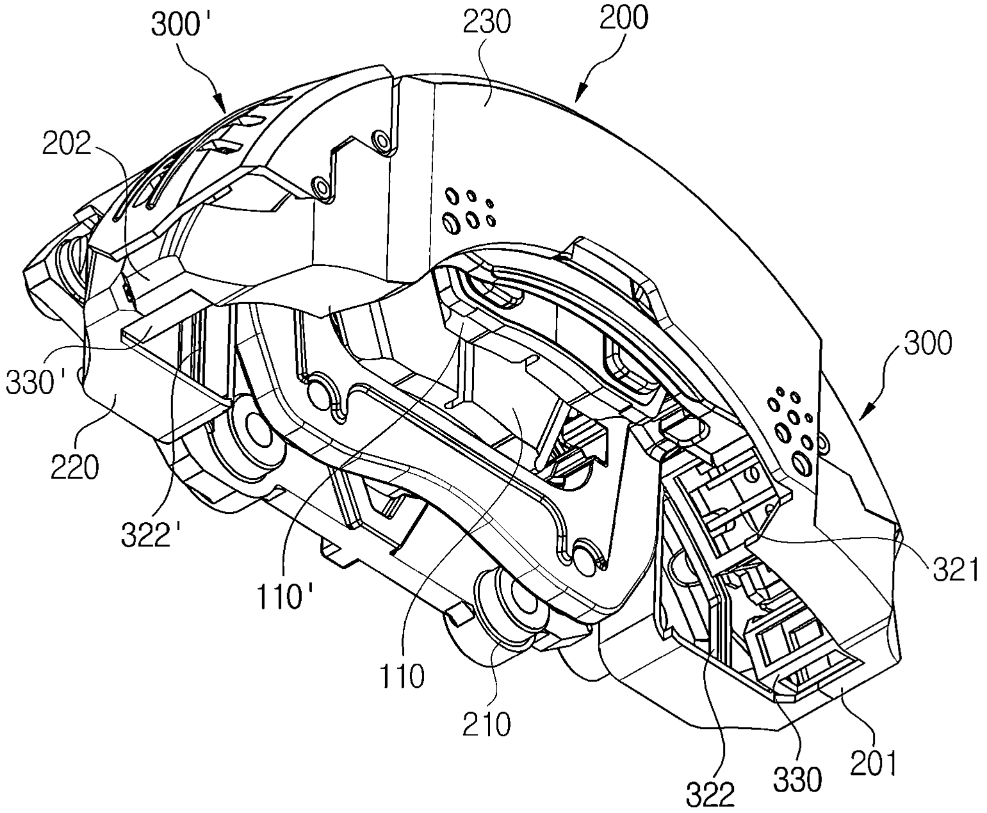
FIG. 5 is a bottom perspective view illustrating the brake dust collector in accordance with one embodiment of the present disclosure.

In addition, FIGS. 3 to 5 are a front perspective view, a rear perspective view, and a bottom perspective view, respectively, which illustrate the brake dust collector in accordance with one embodiment of the present disclosure.

Referring to FIGS. 1 to 5, a brake dust collector according to the present disclosure includes a brake module 100, a housing 200 provided to cover a part of the brake module 100, and filter modules 300 and 300' detachably provided in the housing 200.

More specifically, the brake module 100 includes a pair of brake pads 110 and 110' that are respectively disposed on both sides of a disc D rotating together with a wheel and are in close contact with or separated from the disc D according to the forward and backward movement of a piston. Herein, various driving methods including a hydraulic method and an electromechanical method using a motor may be applied to the forward and backward movement of the piston.

Meanwhile, the housing 200 is formed in a cover shape to cover a part of the brake module 100 and includes a leading portion 201 formed on one side and a trailing portion 202 formed on the other side. In addition, the housing 200 further includes filter module detachable portions 203 and 203' coupled to the filter modules 300 and 300' in the leading portion 201 and the trailing portion 202, respectively.

As illustrated in FIG. 2, the filter module detachable portions 203 and 203' are provided in the shape of holes penetrating the leading portion 201 and the trailing portion 202, respectively, in a circumferential direction of the disc D, and a plurality of seats 203*a* and 203*a* may be provided at outer circumferential surface sides of the holes in order to attach and detach the filter modules 300 and 300'.

In addition, the housing 200 may be provided as a base bracket 210 fastened to the brake module 100, an inner housing 220 fastened to the base bracket 210, and an outer housing 230 fastened to the inner housing 220.

As illustrated in FIGS. 1 and 4, the base bracket 210 is formed to cover a lower side of the brake module 100 and is fixed to the brake module 100 by a fastening member such as a bolt and the like. Herein, the base bracket 210 may be formed to cover only a part of the brake module 100 so that heat generated by the operation of the brake module 100 can be smoothly discharged.

The inner housing 220 has an overall arc shape, is fixed to the base bracket 210 by a fastening member such as a bolt and the like, and is provided to cover one side of an upper portion of the brake module 100. Herein, the inner housing 220 may be formed to make a part of the brake module 100 exposed so that heat generated by the operation of the brake module 100 can be smoothly discharged.

The outer housing 230 has an arc shape corresponding to the inner housing 220, is fixed to the inner housing 220 by a fastening member such as a bolt and the like, and is provided to cover the other side of the upper portion of the brake module 100.

Herein, the filter module detachable portions 203 and 203' may be provided in the leading portion 201 and the trailing portion 202 through the inner housing 220 and the outer housing 230, respectively. In addition, as illustrated in FIGS.

2 and 4, the seats 203*a* and 203*a*' may be provided on the outer housing 230 and the inner housing 220, respectively.

Meanwhile, in the housing 200, the base bracket 210 and the inner housing 220 may be integrally formed, or the inner housing 220 and the outer housing 230 may be integrally formed. In addition, in the housing 200, the base bracket 210, the inner housing 220, and the outer housing 230 may all be integrally formed.

Furthermore, the housing 200 may be provided as a monoblock that is integrally formed with a case of the brake module 100.

In addition, the housing 200 may further include a plurality of heat dissipation holes 204 that are provided to penetrate any one or more surfaces excluding the filter module detachable portions 203 and 203' toward the disc D and discharge heat generated when the brake module 100 is operated.

Meanwhile, the filter modules 300 and 300' include filter covers 310 and 310' provided to be detachable from the filter module detachable portions 203 and 203', and at least one or more filters 320 and 320' provided inside the filter covers 310 and 310'.

Herein, the filter covers 310 and 310' may have a cover shape formed to entirely cover the filter module detachable portions 203 and 203' and include a plurality of filter cover heat dissipation holes 311 and 311' provided to discharge heat generated when the brake module 100 is operated. Herein, the heat dissipation holes 311 and 311' may be utilized not only as exhaust passages of heat but also as fluid passages that induce an air flow according to rotation of the disc D to the filters 320 and 320'.

In addition, the filter covers 310 and 310' may be coupled to and separated from the filter module detachable portions 203 and 203' by an easily detachable fastening member such as a bolt and a pin or a detachable structure such as a rib for fastening and a corresponding groove.

As a means to collect dust that is generated by friction between the brake pads 110 and 110' and the disc D, the filters 320 and 320' are formed to entirely cover the holes of the filter module detachable portions 203 and 203' and provided inside the filter covers 310 and 310', and various shapes and various materials, which are already publicly known, may be applied. In addition, the filters 320 and 320' may include brackets for fastening to the filter covers 310 and 310' or the housing 200.

In addition, the filters 320 and 320' may be provided using various materials including metals that have durability strong against high-pressured washing liquid flowing into the filter cover dissipation holes 311 and 311' for cleansing and sufficient corrosion resistance and heat resistance against pollutants and hot temperatures.

More specifically, the filters 320 and 320' include main filters 321 and 321' provided in a circumferential direction of the disc D and sub filters 322 and 322' provided at one side or both sides of the disc D.

Herein, the main filters 321 and 321' may be detachably provided on inner surfaces of the filter covers 310 and 310'.

In addition, the sub filters 322 and 322' may be detachably provided for the filter modules 300 and 300' or provided to be detachable at a side of the housing 200. Herein, the sub filters 322 and 322', which are provided to be detachable at the side of the housing 200, may be exposed to the outside and detachably provided when the filter modules 300 and 300' are separated from the housing 200.

Accordingly, the brake dust collector according to one embodiment of the present disclosure may not only effectively collect dust generated by friction between the disc D and the brake pads 110 and 110' but also significantly improve maintainability including cleansing and replacement since the filter modules 300 and 300' are provided to be detachable from the housing 200.

Meanwhile, in the brake dust collector according to one embodiment of the present disclosure, the filter module detachable portions 203 and 203' may be provided in only one of the leading portion 201 and the trailing portion 202, and one of the filter modules 300 and 300' may accordingly be provided to be detachable therefrom.

In addition, since the trailing portion 202 is normally formed to extend lower than the leading portion 201, the filter module detachable portions 203 and 203', which are formed in the leading portion 201 and the trailing portion 202, respectively, may be a little different in shape, and in response thereto, the filter modules 300 and 300' may also be a little different in shape.

Figure 6:
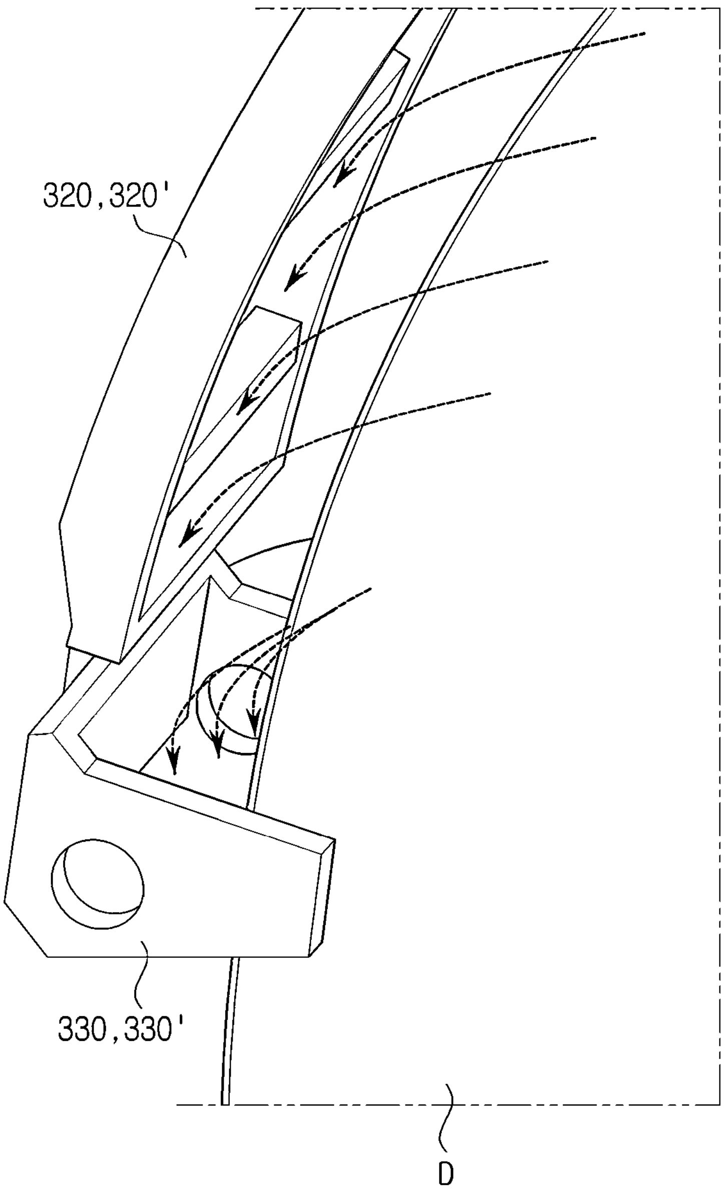
FIG. 6 is a view illustrating a state where dust is collected by the brake dust collector in accordance with one embodiment of the present disclosure.
Figure 7A:
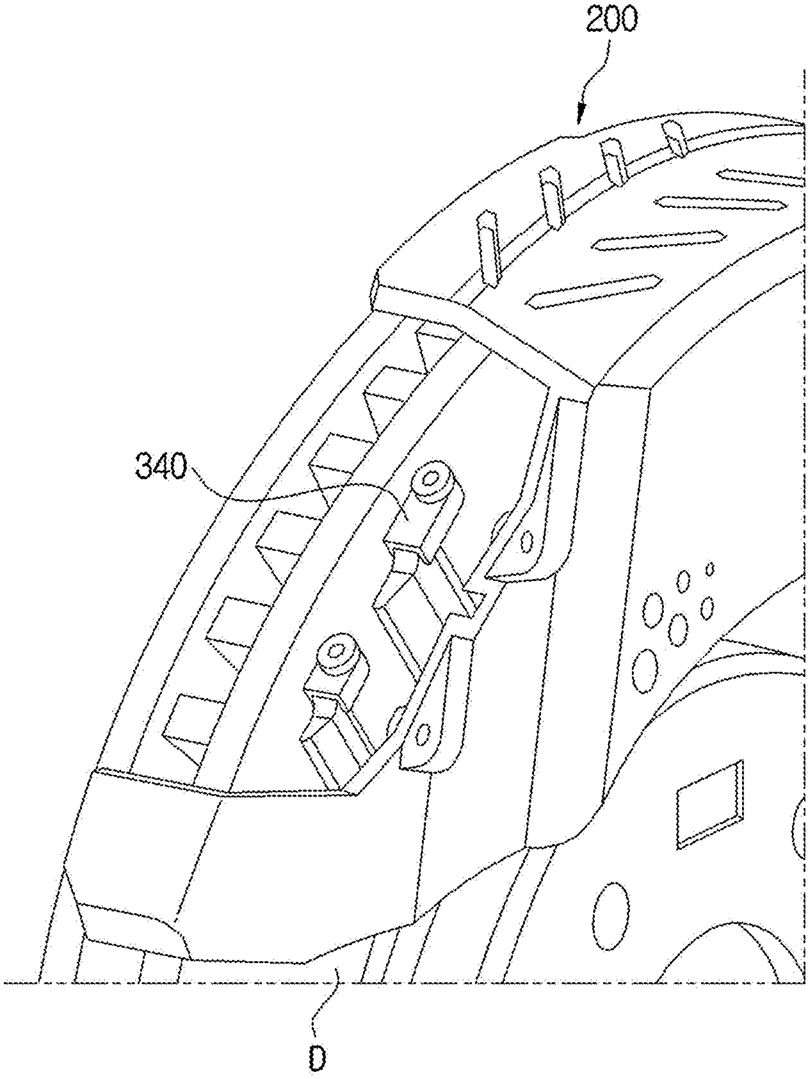
FIGS. 7A and 7B are views illustrating a guide wing of the brake dust collector in accordance with one embodiment of the present disclosure and a fluid flow induced by the guide wing.
Figure 7B:
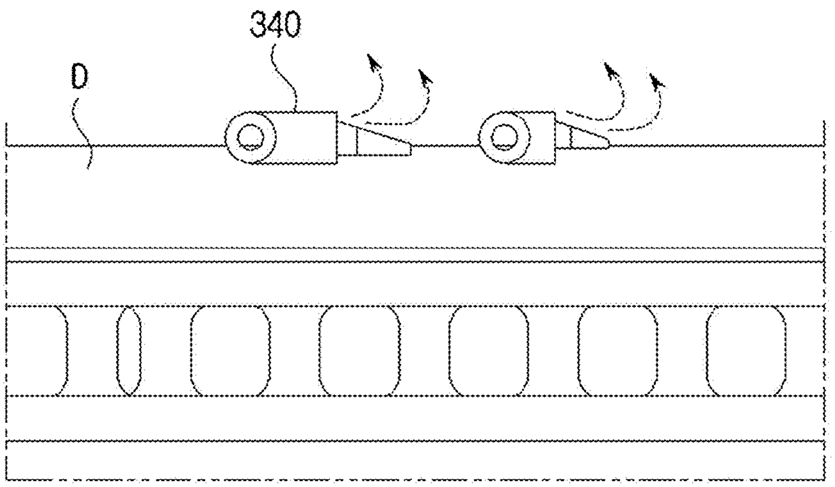
Figure 8A:
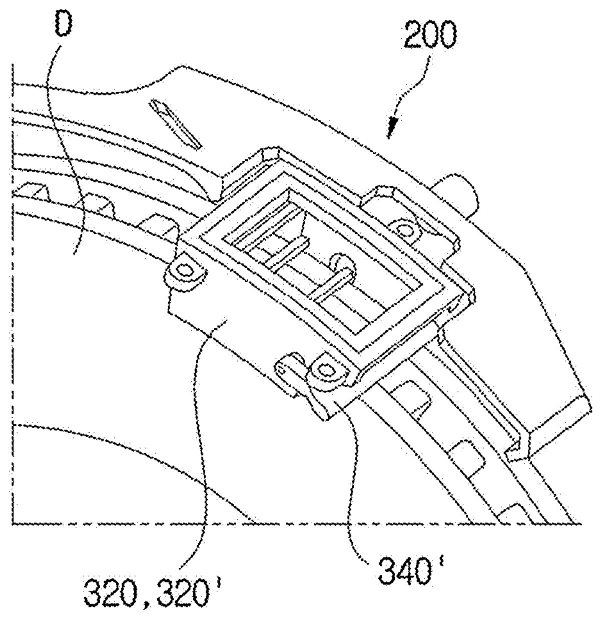
FIGS. 8A to 8C are views illustrating the guide wing of the brake dust collector in accordance with one embodiment of the present disclosure and the fluid flow induced by the guide wing.
Figure 8B:
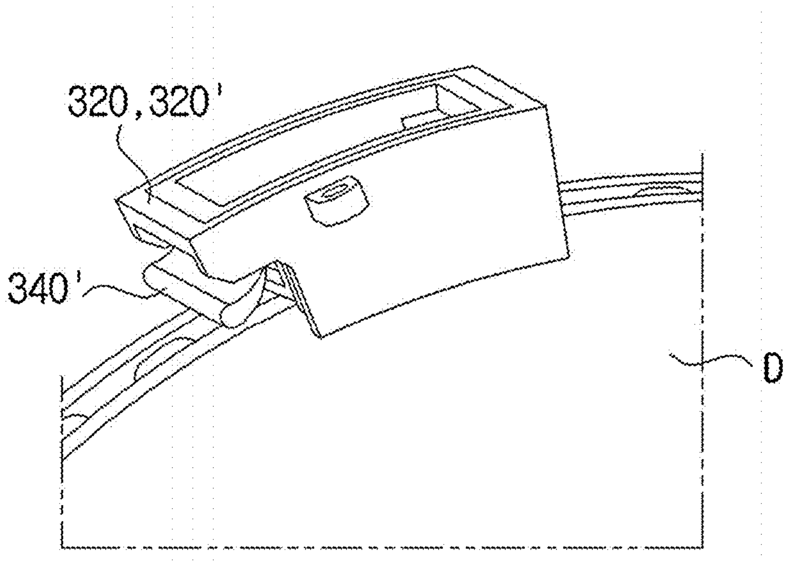
Figure 8C:
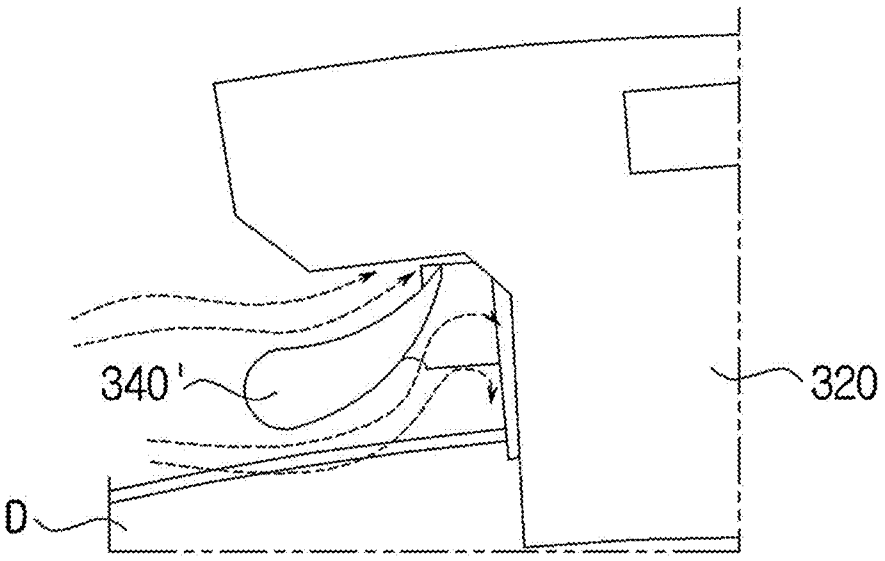

Meanwhile, FIG. 6 is a view illustrating a state where dust is collected by the brake dust collector in accordance with one embodiment of the present disclosure, FIGS. 7A and 7B are views illustrating a guide wing of the brake dust collector in accordance with one embodiment of the present disclosure and a fluid flow induced by the guide wing, and FIGS. 8A to 8C are views illustrating the guide wing of the brake dust collector in accordance with one embodiment of the present disclosure and the fluid flow induced by the guide wing.

Referring to FIGS. 1 to 8, a brake dust collector according to another embodiment of the present disclosure may be described as follows.

The filter modules 300 and 300' may further include dust cups 330 and 330' provided at end sides of the leading portion 201 and the trailing portion 202, respectively.

Herein, the dust cups 330 and 330' have a cup shape with overall top open and are intended to prevent dust not collected by the filters 320 and 320' or dust escaping from the filters 320 and 320' from being finally discharged to the outside of the housing 200.

Thus, the brake dust collector according to this embodiment may minimize the discharge of dust contained in the air flow, which is generated according to a rotating direction of the disc D, as illustrated in FIG. 6, to the outside of the housing 200 through the leading portion 201 or the trailing portion 202.

In addition, the dust cups 330 and 330' may be provided to be fastened to the housing 200 or provided to be fastened to the filter modules 300 and 300' so as to be separable from the housing 200 together with the filter modules 300 and 300'.

Meanwhile, as illustrated in FIGS. 7 and 8, the filter modules 300 and 300' may further include at least one or more guide wings 340 and 340' that are provided adjacent to a side surface or a circumferential surface of the disc D and configured to induce a fluid flow to the filters 320 and 320'.

More specifically, the guide wing 340, which is provided adjacent to the side of the disc D, induces an air flow from one side surface or both side surfaces of the disc D to an inner side of the housing 200 according to a rotating direction of the disc D, as illustrated in FIG. 7B, so that dust contained therein may be effectively collected by the filters 320 and 320'.

In addition, the guide wing 340', which is provided adjacent to the circumferential surface of the disc D, is formed at one lower side of each of the filters 320 and 320' and induces an air flow from the circumferential surface of the disc D to the filters 320 and 320' according to a rotating direction of the disc D, as illustrated in FIG. 8C, so that dust contained therein may be effectively collected by the filters 320 and 320'.

In addition, the guide wings 340 and 340' may be provided to be angle-adjustable for the filters 320 and 320', respectively and may further improve heat dissipation performance by inducing the air flow generated according to rotation of the disc D to the filter cover heat dissipation holes 311 and 311.

Meanwhile, in the brake dust collector according to one embodiment of the present disclosure, the filter module detachable portions 203 and 203' may be provided in only one of the leading portion 201 and the trailing portion 202, and one of the filter modules 300 and 300' may accordingly be provided to be detachable therefrom.

In addition, in the brake dust collector according to another embodiment of the present disclosure, each of the filter modules 300 and 300' may include any one of the dust cups 330 and 330' and the guide wings 340 and 340' or include both the dust cups 300 and 300' and the guide wings 340 and 340'.

A brake dust collector according to one embodiment of the present disclosure can effectively collect dust that is generated by friction between a disc and a brake pad and discharged to the outside of a housing.

A brake dust collector according to one embodiment of the present disclosure can improve dust collection efficiency by filter modules provided in a leading portion and a trailing portion, respectively.

A brake dust collector according to one embodiment of the present disclosure can facilitate filter cleaning and replacement and improve maintainability by providing a filter module detachable from a housing.

A brake dust collector according to one embodiment of the present disclosure can further improve dust collection efficiency by a dust cup that is provided at a lower side of a filter module to finally collect dust discharged to the outside of a housing.

A brake dust collector according to one embodiment of the present disclosure can further improve dust collection efficiency by a guide wing that is provided inside a filter module to control a fluid flow.

A brake dust collector according to one embodiment of the present disclosure can prevent aesthetics of a housing from being reduced by a filter module that is separately provided on one side of the housing.

A brake dust collector according to one embodiment of the present disclosure can further improve heat dissipation performance when exhausting heat caused by friction between a disc and a brake pad to the outside of a housing.

What is claimed is:

1. A brake dust collector comprising:

a brake module including a pair of brake pads that are respectively disposed on both sides of a disc rotating together with a wheel and are in close contact with or separated from the disc according to a forward and backward movement of a piston;

a housing including a base bracket fastened to the brake module, an inner housing fastened to the base bracket, and an outer housing fastened to the inner housing, and configured to cover a part of the brake module by providing filter module detachable portions in a circumferential direction of the disc in a leading portion and a trailing portion, respectively; and filter modules provided to be detachable from the filter module detachable portions, respectively, wherein one side of each of the filter modules is detachable from the outer housing and an other side of each of the filter modules is detachable from the inner housing.

2. The brake dust collector of claim 1, wherein each of the filter module detachable portions is provided across the inner housing and the outer housing.

3. The brake dust collector of claim 1, wherein each of the filter modules comprises:

a filter cover detachably provided for the filter module detachable portion; and at least one filter provided inside the filter cover.

4. The brake dust collector of claim 3, wherein one side of the filter cover is detachable from the outer housing and an other side of the filter cover is detachable from the inner housing.

5. The brake dust collector of claim 3, wherein the filter comprises:

a main filter provided in the circumferential direction of the disc inside the filter cover; and a sub filter provided to a side of the inner housing inside the filter cover.

6. The brake dust collector of claim 5, wherein the sub filter is fastened to an inner side of the inner housing.

7. The brake dust collector of claim 3, wherein the filter module further comprises a dust cup provided below the filter.

8. The brake dust collector of claim 7, wherein the dust cup is fastened to an inner end of each of the leading portion and the trailing portion.

9. The brake dust collector of claim 3, wherein the filter module further comprises at least one guide wing that is provided on a side surface or a circumferential surface of the disc and induces a fluid flow to the filter.

10. The brake dust collector of claim 9, wherein the guide wing is provided to be angle-adjustable for the filter.

11. The brake dust collector of claim 1, wherein the housing further comprises a plurality of heat dissipation holes provided between the filter module detachable portions.

12. A brake dust collector comprising:

a brake module including a pair of brake pads that are respectively disposed on both sides of a disc rotating together with a wheel and are in close contact with or separated from the disc according to a forward and backward movement of a piston;

a housing formed to cover a part of the brake module by providing a filter module detachable portion in a circumferential direction of the disc in at least one of a leading portion or a trailing portion; and one or two filter modules detachably provided for the filter module detachable portion, wherein one side of each of the filter modules is detachable from one side surface of the housing and an other side of each of the filter modules is detachable from an other side surface of the housing.

13. The brake dust collector of claim 12, wherein the filter module comprises:

a filter cover detachably provided for the filter module detachable portion; and at least one filter provided inside the filter cover.

14. The brake dust collector of claim 13, wherein one side of the filter cover is detachable from the one side surface of the housing and an other side of the filter cover is detachable from the other side surface of the housing.

15. The brake dust collector of claim 13, wherein the filter module further comprises a dust cup provided below the filter.

16. The brake dust collector of claim 15, wherein the dust cup is fastened to at least one of an inner end of the leading portion or an inner end of the trailing portion.

17. The brake dust collector of claim 13, wherein the filter module further comprises at least one guide wing that is provided on a side surface or a circumferential surface of the disc and induces a fluid flow to the filter.

18. The brake dust collector of claim 17, wherein the guide wing is provided to be angle-adjustable for the filter.

19. The brake dust collector of claim 12, wherein the housing is a monoblock integrally formed with a case of the brake module.

20. The brake dust collector of claim 12, wherein the housing further comprises a plurality of heat dissipation holes.

* * * * *